United States Patent
Jobanputra et al.

(10) Patent No.: US 8,819,383 B1
(45) Date of Patent: Aug. 26, 2014

(54) NON-DISRUPTIVE REALIGNMENT OF VIRTUAL DATA

(75) Inventors: Varun Jobanputra, San Francisco, CA (US); Andrew Tucker, Portola Valley, CA (US); Eric Paul Forgette, Mechanicsville, VA (US); Subramaniam V. Periyagaram, Santa Clara, CA (US); Mohit Gupta, San Jose, CA (US); Jose Mathew, Santa Clara, CA (US); Vishwajith Shivappa, Sunnyvale, CA (US); Sisir Shekhar, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 345 days.

(21) Appl. No.: 13/399,213

(22) Filed: Feb. 17, 2012

(51) Int. Cl.
*G06F 12/00* (2006.01)
*G06F 3/06* (2006.01)

(52) U.S. Cl.
CPC .......... *G06F 3/0613* (2013.01); *G06F 3/0665* (2013.01)
USPC ..... 711/201; 711/202; 711/154; 711/E12.001

(58) Field of Classification Search
CPC .... G06F 3/0613; G06F 3/0626; G06F 3/0665
USPC ............................. 711/154, 201, 202, E12.001
See application file for complete search history.

(56) References Cited

U.S. PATENT DOCUMENTS

| | | | | |
|---|---|---|---|---|
| 6,931,499 | B2 * | 8/2005 | Delaney et al. | 711/154 |
| 7,296,135 | B2 * | 11/2007 | Thompson | 711/201 |
| 7,809,919 | B2 * | 10/2010 | Thompson | 711/201 |
| 2008/0028162 | A1 * | 1/2008 | Thompson | 711/154 |

OTHER PUBLICATIONS

"Master File Table (MFT)", Apr. 17, 2001, pp. 1-2, http://www.pcguide.com/ref/hdd/file/ntfs/archMFT-c.html.

* cited by examiner

*Primary Examiner* — Pierre-Michel Bataille
(74) *Attorney, Agent, or Firm* — Cooper Legal Group, LLC (57) ABSTRACT

One or more techniques and/or systems are provided for non-disruptively addressing misalignment between a virtual data format and an underlying data format. Virtual data, such as a guest operating system of a virtual machine, may be stored within a virtual structure, such as a virtual machine disk, according to a virtual data format. The virtual structure may be stored within a storage device according to a storage data format. If misalignment is detected, then a new data container may be created within the storage device. A shim, sized according to a misalignment offset, may be inserted into the new data container in order to align the new data container with the storage device. Virtual data may be migrated from the virtual structure to the new data container to achieve alignment. During the migration, the virtual data may remain available from the virtual structure (e.g., a virtual machine may still execute).

27 Claims, 8 Drawing Sheets

NON-DISRUPTIVE REALIGNMENT OF VIRTUAL DATA

FIELD

The instant disclosure pertains to non-disruptively addressing misalignment between a virtual data format associated with a manner with which virtual data is stored within a virtual structure, such as a virtual machine disk, and a storage data format associated with a manner with which data, such as the virtual structure, is stored within a storage device.

BACKGROUND

Virtualization allows, among other things, many computer environments, such as general desktop environments, database servers, web development platforms, etc., to be implemented through software and/or hardware as virtual machines within host computing devices. A virtual machine may comprise its own file structure, virtual hard disks, partitions, operating system (e.g., a guest operating system), applications, data files, and/or configuration, for example. As such, the virtual machine may function as a self-contained computing environment even though it may be an abstraction of underlying software and/or hardware resources (e.g., a virtual machine may be stored as one or more virtual structures, such as a virtual machine disk, within physical storage). That is, the virtual machine may be a software implementation of a physical computing machine that has normal operational functionality of the physical computing machine. For example, a host computing device may comprise virtual machine host software (e.g., a hypervisor) configured to host and manage virtual machines. The virtual machine host software may allow a user to interface and interact with a hosted virtual machine. For example, the user may interact with a guest operating system and/or applications of the hosted virtual machine through the virtual machine host software.

A virtual machine, or one or more portions thereof, may be stored as one or more virtual structures that may be stored within underlying physical storage of one or more storage devices. A virtual structure may comprise virtual storage, such as a virtual hard disk (e.g., a virtual machine disk (.vmdk) format, a virtual hard disk (.vdh) format, etc.). The virtual storage may be a level of abstraction from the storage device (e.g., underlying physical storage) because the virtual storage may store the virtual machine data according to a virtual data format that may not be dependent upon a storage data format specifying how data, such as the virtual structure, is stored within the storage device. For example, a guest operating system of a virtual machine may store a user created text document according to a virtual data format within a virtual hard disk of a virtual structure (e.g., the user created text document may be stored within virtual data blocks of 512 bytes). The virtual data format may be independent of a storage data format used by a storage device to store the virtual structure (e.g., the virtual structure may be stored within physical data blocks of 4096 bytes). That is, the virtual data format (e.g., how virtual machine data is stored within a virtual structure) may be a level of abstraction from the storage data format (e.g., how the data, such as the virtual structure, is stored within underlying physical storage).

Unfortunately, storing virtualized data (e.g., virtual machine data within a virtual structure) within underlying physical storage may result in misalignment. For example, a guest operating system of a virtual machine may store virtual machine data according to a virtual data format within the virtual structure (e.g., the virtual data format may specify that a virtual file system of the virtual machine stores data within 512 byte blocks starting at an offset of 63 blocks within the virtual structure). However, the virtual structure may be stored within a storage device (e.g., underlying physical storage) according to a storage data format (e.g., the virtual structure may be stored within physical data blocks of 4096 bytes). If the virtual data format and the storage data format align, then virtual data blocks may be stored within corresponding underlying physical data blocks without overlapping into additional underlying physical data blocks (e.g., virtual data blocks may span no more than one underlying physical data block).

If the virtual data format and the storage data format do not align, however, then virtual data blocks may end up being stored across one or more additional underlying physical data blocks (e.g., a virtual data block may span more than one underlying physical data block). Thus, if a virtual data block is misaligned, then an I/O operation for the virtual data block may entail accessing more than one underlying physical data block (e.g., a first portion of the virtual data block may be read from a first underlying physical data block and a second portion of the virtual data block may be read from a second underlying physical data block). Such additional I/O operations may result in performance degradation. For example, access to a guest operating system and/or user data of a virtual machine may take twice as long because more than one I/O operation to underlying data storage may need to be performed to access a single virtual data block due to the misalignment.

SUMMARY

The disclosure relates to, at least, one or more techniques and/or systems that non-disruptively address misalignment between a virtual data format and a storage data format within a virtualized storage environment. Misalignment between the virtual data format and the storage data format may be detected through a variety of detection techniques. In one example, a virtual data format associated with a manner with which virtual data is stored within a virtual structure (e.g., a guest operating system of a virtual machine may store virtual data within a virtual hard disk using 512 byte virtual data blocks) may be compared with a storage data format associated with a manner with which data is stored within a storage device (e.g., a host operating system may store data, such as the virtual structure, within an underlying physical storage device using 4096 byte physical data blocks) to determine a misalignment offset.

The virtual data format may be identified by querying metadata within the virtual structure to determine a virtual block size and/or a virtual offset of the virtual structure as the virtual data format (e.g., the virtual structure may be opened and read using a virtual machine application programming interface so that one or more bytes, for example, of data within the virtual structure may be searched for metadata describing how virtualized data is stored within the virtual structure). For example, a master boot record, a global unique ID (GUID) partition table, and/or a range of bytes within the virtual structure comprising a metadata table (e.g., the first or last 512 bytes) may be searched for virtual data format information. The storage data format may be identified by querying configuration data associated with the storage device to determine a storage block size and/or a storage offset of the storage device as the storage data format. The virtual block size and the virtual offset of the virtual data format may be compared with the storage block size and the storage offset of the storage data format to determine the misalignment offset (e.g., the misalignment offset may be determined as a remainder of a modulus (MOD) operation used to compare the virtual data format and the storage data format).

Once misalignment is detected, a new data container (e.g., a new data volume, a new virtual structure, a new logical unit number (LUN), etc.) may be created within the storage device. A shim for the new data container may be created based upon the misalignment offset. For example, the shim may comprise padding sized according to the misalignment offset (e.g., if the misalignment offset is 20 bytes, then the shim may comprise 20 bytes of zero-filled padding). The shim may be inserted into a starting location of the new data container (e.g., at a block offset of 0). In this way, the new data container may store shimmed virtual data or rather virtual data that has been shimmed that may be aligned with underlying physical storage (e.g., shimmed virtual data blocks may span no more than one underlying physical data block). In particular, shimmed virtual data blocks may be stored at adjusted I/O offsets (e.g., virtual block offsets adjusted based upon the size of the shim) within the new data container. For example, shimmed virtual data may comprise an adjusted I/O offset of 512 bytes based upon a 512 byte shim, where the original virtual data within the virtual structure comprised an original I/O offset of 0 bytes. Because the shimmed virtual data blocks may align with underlying physical data blocks, a data I/O operation for a shimmed virtual data block may translate into a single data I/O operation to an underlying physical data block.

Because the virtual data within the virtual structure is misaligned, the virtual data may be migrated from the virtual structure to the new data container as shimmed virtual data. The migration may comprise adjusting I/O offsets of shimmed virtual data according to the shim (e.g., virtual block offsets at which shimmed virtual data are stored within the new data container may be adjusted based upon a size of the shim). In this way, the shimmed virtual data within the new data container may be aligned with underlying physical storage.

It may be appreciated that conventional realignment techniques are disruptive in nature because such techniques require the virtual data to become unavailable during realignment (e.g., because such techniques may modify the existing virtual structure as opposed to creating a new data container). In one example, a virtual machine may need to be turned off and made unavailable during the entire duration of the realignment process, which may take a substantial amount of time (e.g., hours to days). In another example, a conventional reboot realignment technique may be performed that disruptively copies a source virtual structure to a destination virtual structure. In particular, a partition of the destination virtual structure may be adjusted according to the misalignment to create an aligned destination virtual structure. A write log may be started where new updates to the source virtual structure may be stored during a copy procedure. The data from the source virtual structure may be copied to the aligned destination virtual structure. However, access to a virtual machine may be disrupted because the virtual machine is powered down so that the write log may be applied to the copied data at the aligned destination virtual structure, which may take several minutes. While the virtual machine is/remains powered down, the source virtual structure is replaced with the aligned destination virtual structure, and a file system of the aligned destination virtual structure may be modified. Once replaced, the virtual machine may be powered back on (e.g., rebooted). Notably, however, the virtual data is unavailable during this disruptive realignment process (e.g., that takes a not insignificant amount of time to perform).

Accordingly, the techniques described herein provide for non-disruptively addressing misalignment. In particular, the virtual data within the virtual structure may be made available during realignment (e.g., I/O requests for the virtual data may be satisfied from the misaligned virtual structure during migration of the virtual data to the new data container). For example, during migration of a virtual machine from the virtual structure to the new data structure, the virtual machine may be available to a user and/or application (e.g., a user may interact with a guest operating system and/or virtual user data of the virtual machine, etc.). Additionally, realignment may be performed without a reboot and/or modification to file systems, which may result in a faster and safer realignment (e.g., detection of false positives may be mitigated from intrusion detection systems).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

Virtualization allows computing environments and/or data storage to be abstracted away from underlying storage devices upon which they may reside (e.g., so that multiple virtual computing environments may be established on a single physical device for various testing and/or other purposes). For example, a computing environment may be virtualized into a virtual machine, and data storage may be virtualized into a logical unit number (LUN) by a hypervisor. Unfortunately, misalignment may occur between virtual data and an underlying storage device that comprises the virtual data. For example, a virtual hard disk that is misaligned with an underlying storage device may cause virtual data blocks within the virtual hard disk to span more than one underlying data block of the underlying storage device. Such misalignment may reduce performance of a virtual machine residing within the virtual hard disk because additional data I/O operations may have to be performed to access virtual data (e.g., two data I/O operations may need to be performed to access a single virtual data block that spans two underlying data blocks). For example, a database, an email server and/or other applications hosted by a misaligned virtual machine may experience performance degradation (e.g., speed, overhead required, resources consumed, etc.) of two-times or more compared to an aligned virtual machine.

Accordingly, as provided herein, misalignment is addressed in a non-disruptive manner, such that virtual data may be available during the duration of the realignment process. Such misalignment may be corrected by migrating misaligned virtual data from a misaligned virtual structure to a new data container realigned using a shim. During migration, data I/O operations for the misaligned virtual data may be satisfied from the misaligned virtual structure, thus maintaining availability of the virtual data (e.g., a virtual machine may be operable during realignment, virtual data of a LUN may be available to a user and/or an application during realignment, etc.). Addressing misalignment may reduce unnecessary I/O operations to additional underlying data blocks. In this way, access to the virtual data may be improved by reducing access time to the shimmed virtual data within the new data container.

Figure 1:
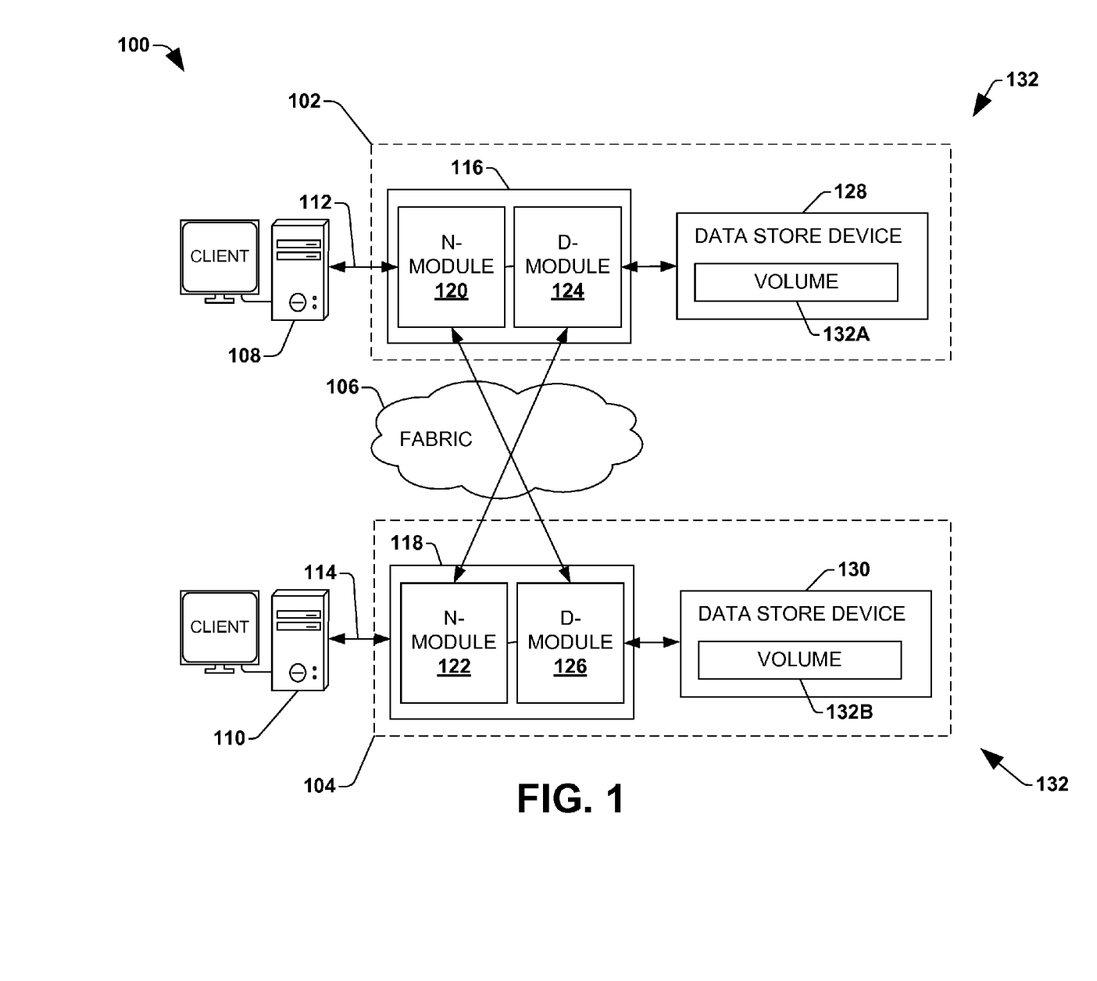
FIG. 1 is a component block diagram illustrating an example clustered network in accordance with one or more of the provisions set forth herein.
Figure 2:
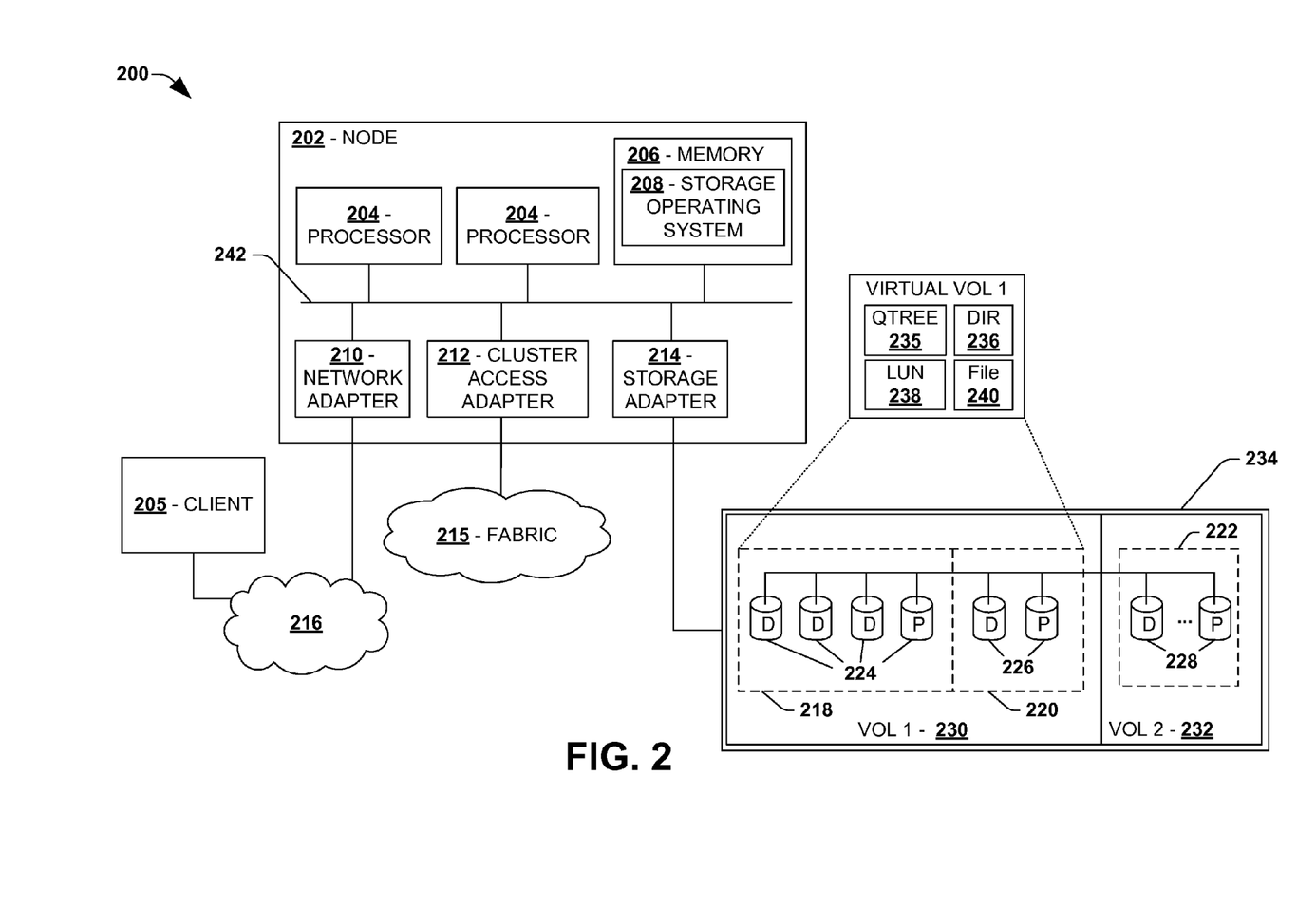
FIG. 2 is a component block diagram illustrating an example data storage system in accordance with one or more of the provisions set forth herein.

To provide context for where misalignment between a virtual data format and a storage data format may occur, be detected and/or corrected as provided herein, FIG. 1 illustrates a clustered network environment 100 (e.g., a network storage environment), and FIG. 2 illustrates an embodiment of a data storage system 200 (e.g., comprising a storage server) that may be implemented to store and manage data in this clustered network environment, such as a virtual structure comprising virtual data (e.g., a virtual machine disk comprising a virtual machine). It may be appreciated, however, that the techniques described herein may be implemented within the clustered network environment 100, a non-cluster network environment, and/or a variety of other computing environments to mitigate network usages. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that virtualized data, such as a virtual machine and/or a logical unit number (LUN), may be implemented within environment 100. For example, one or more virtual machines may be stored as virtual structures within one or more of the data storage devices 128, 130. One or more of the data storage devices 128, 130 may store a virtual structure according to a storage data format (e.g., an underlying physical storage data format specifying a manner in which physical data blocks are stored within a storage device). One or more of the nodes 116, 118, for example, may be configured as host computing devices for a virtual machine. In particular, one or more of nodes 116, 118 may comprise virtual machine host software that may host a virtual machine within a virtual structure stored within one or more of data storage devices 128, 130. One or more of the nodes 116, 118 may allow one or more clients 108, 110 to interface with the hosted virtual machine (e.g., access a guest operating system, user data, and/or applications of the hosted virtual machine). One or more of the nodes 116, 118 and/or one or more of clients 108, 110 may comprise a logical application configured to interact with virtual data of a virtual structure stored within one or more of the data storage devices 128, 130. Unfortunately, virtual data within the virtual structure may be misaligned within one or more of the data storage devices 128, 130 (e.g., based upon misalignment between a virtual data format associated with a manner with which virtual data is stored within a virtual structure and a storage data format associated with a manner with which data is stored within a storage device).

Accordingly, a misalignment detection component, an alignment component, and/or a logical replication component may be implemented within environment 100 (e.g., one or more of such components may be implemented on one or more of clients 108, 110, nodes 116, 118 and/or other computing devices not illustrated that may have access to data storage devices 128, 130). It may be appreciated that one example of implementing a misalignment detection component and an alignment component is illustrated and described relative to FIG. 5 and FIG. 6, and that one example of implementing a logical replication component is illustrated and described relative to FIG. 7. The misalignment detection component may be configured to detect misalignment. The misalignment detection component may utilize a virtual machine management platform (e.g., a hypervisor within environment 100) to discover that the virtual structure is associated with a virtual machine (e.g., a virtualization discovery report may be provided by the virtual machine management platform). Additionally, the misalignment detection component may utilize a virtual machine application programming interface (e.g., an API configured to read and open one or more virtual machines located within environment 100, such as on one or more of nodes 116, 118) to open and read the virtual structure for metadata indicating how virtual data may be stored within the virtual structure (e.g., a virtual data format). The alignment component may be configured to non-disruptively address misalignment, while providing access to virtual data during realignment.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provide access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that virtualized data, such as a virtual machine and/or a logical unit number (LUN), may be implemented within data storage system 200. For example, one or more virtual machines may be stored as virtual structures within data storage device 234 (e.g., or one or more data storage devices). The data storage device 234 may store a virtual structure according to a storage data format (e.g., an underlying physical storage data format specifying a manner in which physical data blocks are stored within a storage device). Node 202 may, for example, be configured as a host computing device for a virtual machine. In particular, node 202 may comprise virtual machine host software that may host a virtual machine stored on data storage device 234. The node 202 may allow client 205 to interface with the hosted virtual machine (e.g., access a guest operating system, user data, and/or applications of the hosted virtual machine). Client 205 and/or node 202 may comprise a logical application configured to interact with virtual data of a virtual structure stored within data storage device 234. Unfortunately, virtual data within the virtual structure may be misaligned within the data storage device 234.

Accordingly, a misalignment detection component, an alignment component, and/or a logical replication component may be implemented within data storage system 200 (e.g., one or more of such components may be implemented on one or more of client 205, node 202, and/or on other computing devices not illustrated that may have access to data storage device 234). It may be appreciated that one example of implementing a misalignment detection component and an alignment component is illustrated and described relative to FIG. 5 and FIG. 6, and that one example of implementing a logical replication component is illustrated and described relative to FIG. 7. The misalignment detection component may be configured to detect misalignment. The misalignment detection component may utilize a virtual machine management platform (e.g., a hypervisor associated with data storage system 200) to discover that the virtual structure is associated with a virtual machine (e.g., a virtualization discovery report may be provided by the virtual machine management platform). Additionally, the misalignment detection component may utilize a virtual machine application programming interface (e.g., an API configured to read and open one or more virtual machines associated with data storage system 200, such as node 202) to open and read the virtual structure for metadata indicating how virtual data may be stored within the virtual structure (e.g., a virtual data format). The alignment component may be configured to non-disruptively address misalignment, while providing access to virtual data during realignment.

Figure 3:
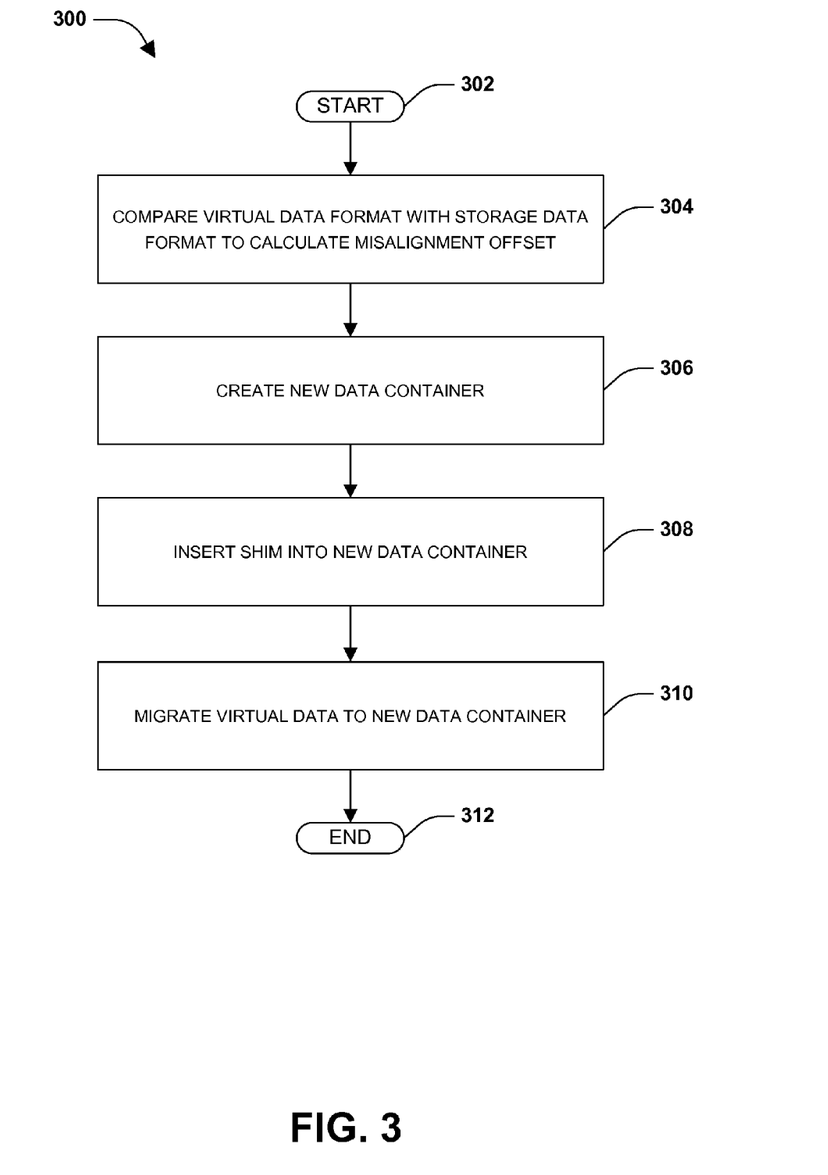
FIG. 3 is a flow chart illustrating an exemplary method of non-disruptively addressing misalignment between a virtual data format and a storage data format within a virtualized storage environment.

One embodiment of non-disruptively addressing misalignment between a virtual data format and a storage data format within a virtualized storage environment is illustrated by an exemplary method 300 in FIG. 3. At 302, the method starts. A virtual structure, such as a logical unit number (LUN) and/or a virtual machine (e.g., a virtual machine disk, such as a .vmdk, a .vdh, and/or other virtual disk formats), may be stored within a storage device using a storage data format (e.g., an underlying physical storage data format specifying a physical storage block size and/or storage offsets). The storage data format may correspond to a storage block size, a storage offset, and/or other formatting information related to how data, such as the virtual structure, is stored within the storage device. The storage data format may be determined by querying storage configuration data associated with the storage device.

The virtual structure may comprise virtual data stored according to a virtual data format (e.g., a LUN may comprise virtualized data; a virtual machine disk may comprise a virtual file system implemented by a guest operation system of a virtual machine; etc.). In one example of identifying the virtual structure, a virtualization management platform may be used to discover the virtual structure (e.g., a virtual machine management platform may provide a virtualization discovery report specifying that a virtual machine disk is associated with a virtual machine). An application programming interface on the storage device may be invoked to open and/or read the virtual structure (e.g., a virtual machine application programming interface may allow a virtual structure to be opened and/or read regardless of the state of the corresponding virtual machine). In this way, the virtual structure may be opened and searched for metadata that may describe the virtual data format or a manner in which virtual data is stored within the virtual structure (e.g., the first and/or last 512 bytes of the virtual structure may be read, a master boot record within the virtual structure may be searched and/or a global unique ID partition table may be searched, etc.). The virtual data format may comprise a virtual block size (e.g., a size of virtual data blocks within which a guest operating system of a virtual machine may store virtual data) and/or a virtual offset (e.g., a starting virtual data block at which the virtual structure begins) associated with the manner in which virtual data is stored within the virtual structure. In this way, the virtual data format may be determined.

At 304, the virtual data format associated with the manner with which virtual data is stored within the virtual structure may be compared with the storage data format associated with the manner with which data is stored within the storage device to determine a misalignment offset. In one example, the misalignment offset may be derived from a comparison (e.g., a remainder of a modulus (MOD) operation) of the virtual block size and virtual offset of the virtual data format and the storage block size and storage offset of the storage data format. For example, virtual data of the virtual structure may be stored within 512 byte virtual data blocks within the virtual structure, the virtual structure may start at a virtual offset of 63 blocks, and the storage device may store data within 4096 byte underlying physical data blocks within the storage device. Thus, a product of 512 and 63 may be determined, and then compared to 4096, which produces a remainder that indicates that the virtual structure may be misaligned with the storage device. The remainder may be used to derive the misalignment offset.

At 306, a new data container may be created within the storage device. The new data container may comprise a new data volume, a new virtual structure, a new logical unit number (LUN), etc. The new data container may be modified with a shim to align the new data container with the storage device. The shim may be sized according to the misalignment offset. For example, the shim may comprise padding (e.g., non-user data such as zero-filled padding) sized according to the misalignment offset. At 308, the shim may be inserted into the new data container. For example, the shim may be inserted into a starting location of the new data container (e.g., offset 0). In this way, the new data container may be aligned with the storage device because the shim may compensate for the misalignment offset. Accordingly, virtual data may be stored as shimmed virtual data within the new data container at adjusted I/O offsets (e.g., virtual block offsets adjusted based upon the size of the shim).

At 310, virtual data within the virtual structure may be migrated to the new data container as shimmed virtual data. For example, the shimmed data may be stored at adjusted I/O offsets derived from a size of the shim. For example, shimmed virtual data may comprise an adjusted I/O offset of 512 bytes based upon a 512 byte shim, where the original virtual data within the virtual structure comprised an original I/O offset of 0 bytes. It may be appreciated that the virtual data may be available within the virtual structure during the realignment process, such as during the migration (e.g., unlike conventional migration techniques that disrupt access to the virtual data by requiring the virtual data to go offline, such as shutting down a virtual machine because such conventional techniques may modify the existing virtual structure as opposed to creating a new data container). In one example, the virtual data may be migrated to the new data container without interrupting access to a guest operating system of a virtual machine stored within the virtual data (e.g., the guest operating system may be hosted from the existing virtual structure). The misalignment detection, the creating the new data container comprising the shim, and/or the migrating the virtual data to the new data container may, for example, be performed automatically while a guest operating system of a virtual machine stored within the virtual data is executing from the existing virtual structure (e.g., I/O requests for virtual data not yet migrated may be satisfied from the existing virtual structure). That is, the guest operating system may operate using virtual data within the existing virtual structure while virtual data is migrated from the existing virtual structure into the new data container.

In one example of migrating the virtual data to the new data container, a migration operation request may be sent to a hypervisor (e.g., virtual machine host software configured to manage virtual machines) using an application programming interface (API), for example. In response to the migration operation request, the hypervisor may create a new virtual hard drive (e.g., a vmdk file) within the new data container. The new virtual hard drive may be aligned within the new data container because the new data container comprises the shim that offsets the new virtual hard drive into an aligned position (e.g., an aligned starting offset within the new data container). The hypervisor may copy the virtual data into the new virtual hard drive. If the virtual data corresponds to a virtual machine, then the hypervisor may configure the virtual machine to utilize the new virtual hard drive (e.g., once migration is complete).

Once virtual data has been migrated to the new data container as shimmed virtual data, an I/O request for requested virtual data may be satisfied using shimmed virtual data. Because a shimmed location of the shimmed virtual data within the new data container may differ from an original location of the virtual data within the virtual structure, a target location specified within the I/O request may be modified based upon an adjusted I/O offset applied to the shimmed virtual data. In this way, the shimmed virtual data corresponding to the requested virtual data may be identified to satisfy the I/O request.

In one example, an I/O request for requested virtual data may be identified as originating from a logical application (e.g., an application configured to interact with virtual data logically stored within a virtual structure, such as a LUN, regardless of how the virtual data is physically stored). A response to the I/O request may be sent to the logical application. The response may comprise shim information or rather information about the shim (e.g., a size of the shim, information regarding the misalignment, an adjusted I/O offset, etc.) and shimmed virtual data within the new data container as the requested virtual data. The shimmed virtual data may be identified and retrieved as the requested virtual data by modifying a target location specified within the I/O request of the requested data (e.g., the target location may be modified by an adjusted I/O offset derived from a size of the shim) so that the modified target location may point to the corresponding shimmed virtual data.

The logical application may be instructed to provide the shim information to a destination location within which the requested virtual data is to be stored (e.g., the logical application may comprise replication functionality configured to replicate the requested virtual data to the destination location). In this way, the logical application may provide the shim information and the requested virtual data (e.g., the shimmed data provided to the logical application from a source location, such as the new data container) to the destination location so that the requested virtual data may be stored within the destination location using an adjusted I/O offset derived from the shim information. It may be appreciated that one example of propagating shimmed virtual data from a source location to a destination location is illustrated in example 700 of FIG. 7. Without providing the shim information (e.g., information about the shim) to the destination location, the requested virtual data may be misaligned at the destination location because the destination location may not comprise the shim that was inserted into the new data container to address misalignment. In this way, shimmed virtual data may be propagated from a source location to a destination location within a virtualized storage environment while mitigating misalignment. At 312, the method ends.

Figure 4:
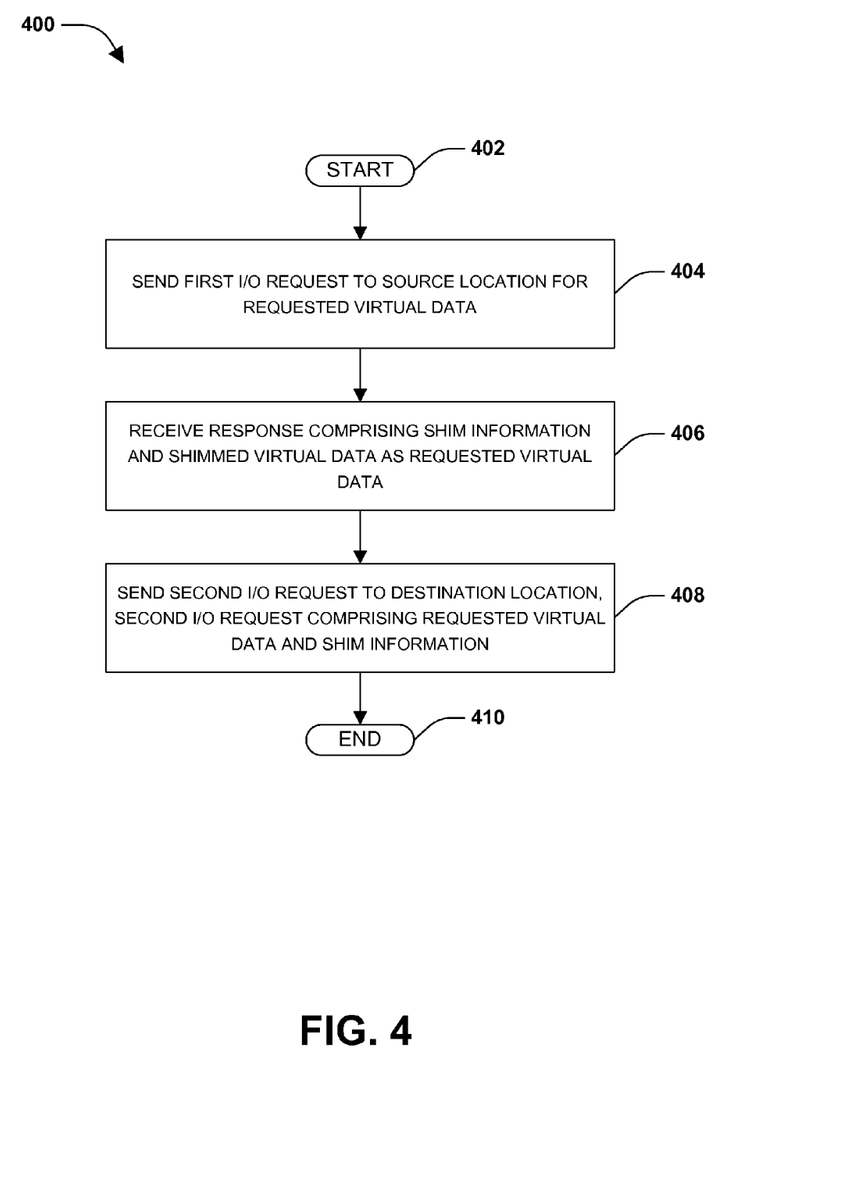
FIG. 4 is a flow chart illustrating an exemplary method of propagating shimmed virtual data from a source location to a destination location within a virtualized storage environment.

One embodiment of propagating shimmed virtual data from a source location to a destination location within a virtualized storage environment is illustrated by an exemplary method 400 in FIG. 4. At 402, the method starts. It may be appreciated that one example of propagating shimmed virtual data from a source location to a destination location is illustrated in example 700 of FIG. 7. In one example, a logical application may comprise functionality configured to interact with virtual data logically stored within a virtual structure, such as a LUN, regardless of how the virtual data is physically stored. In one example, the logical application may interact with virtual data stored within a new data container, such as a shimmed LUN comprising shimmed virtual data, of a storage device. For example, the logical application may send a first I/O request to a source location for requested virtual data stored as shimmed virtual data within the new data container of the storage device, at 404.

At 406, the logical application may receive a response comprising shim information (e.g., information about a shim) and shimmed virtual data as the requested virtual data. The shim information may comprise an adjusted I/O offset of the shimmed virtual data used to offset misalignment between a virtual data format associated with a manner with which virtual data is stored within a misaligned virtual structure and a storage data format associated with a manner with which data is stored within the storage device (e.g., a source location).

In one example, the logical application may store the requested virtual data within a destination location. Unfortunately, the destination data container at the destination location may be misaligned, and may not comprise a shim similar to that of the new data container at the source location. Accordingly, the logical application may send a second I/O request to the destination location, at 408. The second I/O request may comprise the requested virtual data and the shim information. The shim information may be used at the destination location to store the requested virtual data using the adjusted I/O offset. In this way, the requested virtual data may be aligned within the destination location (e.g., the requested virtual data may be stored as shimmed virtual data within a misaligned LUN at the destination location, such that the shimmed virtual data may be aligned with underlying physical storage of the destination location). At 410, the method ends.

Figure 5:
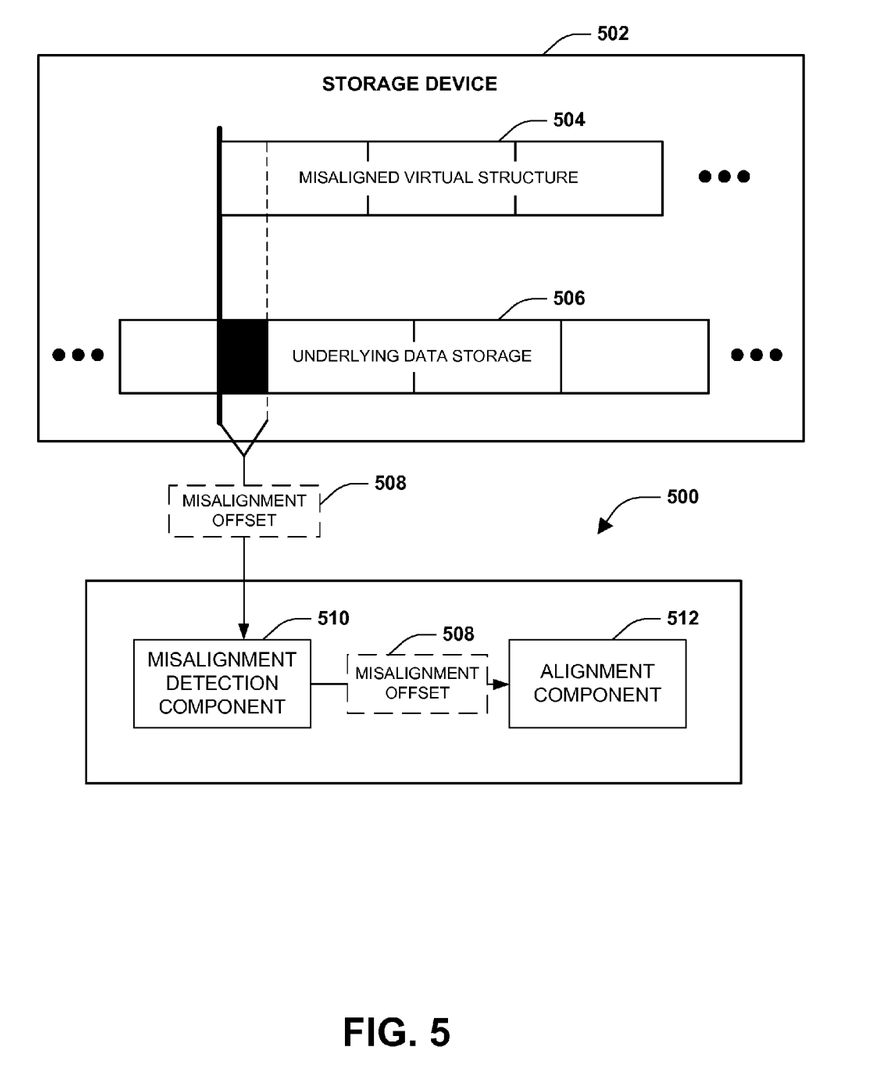
FIG. 5 is a component block diagram illustrating an exemplary system for non-disruptively addressing misalignment between a virtual data format and a storage data format within a virtualized storage environment.

FIG. 5 illustrates an example of a system 500 configured to non-disruptively address misalignment between a virtual data format and a storage data format within a virtualized storage environment. The virtualized storage environment may comprise one or more storage devices, such as storage device 502 (e.g., electronic based storage devices, magnetic based storage device, and/or other devices configured to store data). One or more nodes (e.g., 116, 118 in FIG. 1, 202 in FIG. 2), such as storage servers, within the virtualized storage environment may be configured to store data and/or provide clients (e.g., 108, 110 in FIG. 1, 205 in FIG. 2) with access to data stored within the storage device 502 (e.g., 128, 130 in FIG. 1, 234 in FIG. 2). In one example, a node may be configured to store a virtual structure, such as a logical unit number (LUN) and/or a virtual machine (e.g., a virtual machine disk), comprising virtual data. The virtual structure may be stored within the storage device 502 (e.g., within underlying data storage 506) according to a storage data format (e.g., data may be stored within physical storage blocks located within the storage device 502 according to a storage block size and storage offsets). It may be appreciated that in one example, at least a portion of system 500 may be implemented within one or more nodes within the virtualized storage environment. For example, the system 500 may comprise a misalignment detection component 510 and/or an alignment component 512 that may be implemented within one or more storage servers.

The misalignment detection component 510 may be configured to detect misalignment between a virtual structure 504 and the underlying data storage 506 of the storage device 502. In particular, the misalignment detection component 510 may compare a virtual data format associated with a manner with which virtual data is stored within the virtual structure 504 (e.g., virtual data may be stored within 4k byte virtual blocks) and a storage data format associated with a manner with which data is stored within the storage device 502 (e.g., data may be stored within 4096 byte physical data blocks within the underlying data storage 506) to determine a misalignment offset 508. The misalignment offset 508 may be utilized by the alignment component 512 to non-disruptively address the misalignment so that the virtual data within the virtual data structure 504 may be stored within a new data container without misalignment.

In one example, the virtual structure 504 may be stored within the underlying data storage 506. An initial offset (0) of the virtual structure 504 may not start at an edge of an underlying physical data block, but instead at a location within an underlying physical data block. Thus, the virtual structure 504 may be detected as being misaligned with respect to the underlying data storage 506. Due to the misalignment, virtual blocks within the virtual structure 504 may span more than one underlying physical data block, which may cause a data I/O operation for a virtual block to translate into two data I/O operations to two underlying physical data blocks (e.g., a read I/O operation to the first virtual block of the virtual structure 504 may result in a first read I/O operation to a first underlying physical data block and a second read I/O operation to a second underlying physical data block). The misalignment detection component 510 may compare the virtual format and the storage data format to detect the misalignment offset 508, which may be used by the alignment component 512 to address the misalignment.

Figure 6:
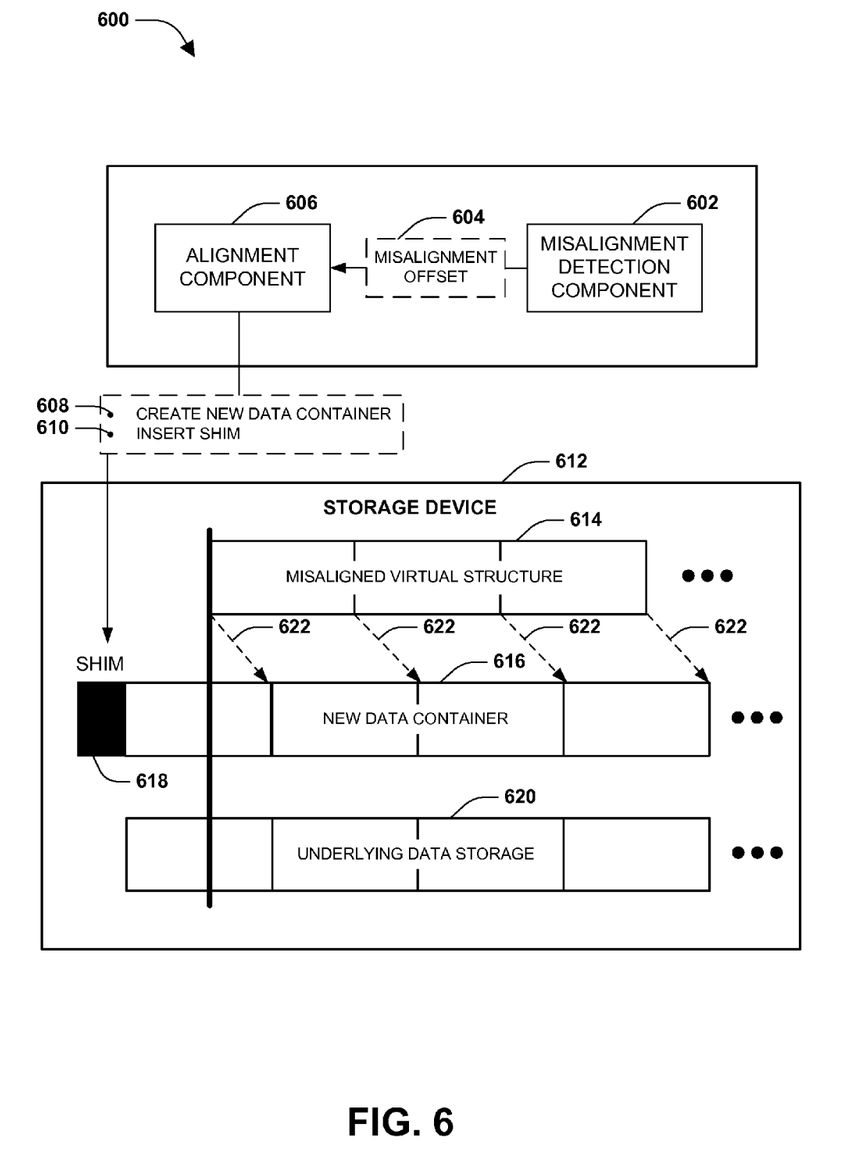
FIG. 6 is a component block diagram illustrating an exemplary system for non-disruptively addressing misalignment between a virtual data format and a storage data format within a virtualized storage environment.

FIG. 6 illustrates an example of a system 600 configured to non-disruptively address misalignment between a virtual data format and a storage data format within a virtualized storage environment. The system 600 may comprise a misalignment detection component 602 and/or an alignment component 606 (e.g., which may be implemented within a node (e.g., 116, 118 in FIG. 1, 202 in FIG. 2), such as a storage server, configured to store data and/or provide clients (e.g., 108, 110 in FIG. 1, 205 in FIG. 2) with access to data stored within storage devices (e.g., 128, 130 in FIG. 1, 234 in FIG. 2) of the virtualized storage environment). The misalignment detection component 602 may be configured to detect misalignment between a virtual structure 614 and underling data storage 620 of a storage device 612. In particular, the misalignment detection component 602 may determine a misalignment offset 604 by comparing the virtual data format and the storage data format.

The alignment component 606 may be configured to create 608 a new data container 616, such as a new data volume, based upon the detected misalignment. To address misalignment that may occur with the new data structure 616, the alignment component 606 may insert 610 a shim 618 into a starting location of the new data container 616 to compensate for the misalignment. For example, the shim 618 may comprise padding (e.g., zeroes) sized according to the misalignment offset 604. In this way, the new data container 616 may be aligned with the underlying data storage 620 (e.g., whereas the virtual structure 614 may remain misaligned with respect to the underlying data storage 620).

The alignment component 606 may be configured to migrate 622 virtual data within the virtual structure 614 to the new data container 616 as shimmed virtual data. The migrating may comprise adjusting I/O offsets of shimmed virtual data according to the shim. For example, shimmed virtual data may comprise an adjusted I/O offset of 512 bytes based upon a 512 byte shim, where the original virtual data within the virtual structure 614 comprised an original I/O offset of 0 bytes. The alignment component 606 may be configured to maintain availability of the virtual data within the virtual structure 614 during the migration (e.g., unlike convention migration techniques that disrupt access to the virtual data by requiring the virtual data to go offline, such as shutting down a virtual machine because such conventional techniques may modify the existing virtual structure 614 as opposed to creating the new data container 616). For example, the alignment component 606 may migrate 622 the virtual data to the new data container 616 without interrupting access to a guest operating system of a virtual machine stored within the virtual structure 614 (e.g., I/O requests associated with the guest operating system may be satisfied from the virtual structure 614 during migration). In this way, the system 600 may non-disruptively address misalignment.

The alignment component 606 may be configured to satisfy an I/O request for requested virtual data using shimmed virtual data within the new data container 616. For example, a read I/O request may attempt to read an image file saved within a virtual machine stored within the virtual structure 614 at a target location (e.g., at an I/O offset of 0). Because the image file was migrated to the new data structure 616, the target location may be modified by adjusting the I/O offset of 0 with an adjusted I/O offset (e.g., 512 bytes adjusted I/O offset derived from a size of the shim 618 may be used to adjust the I/O offset to 512). In this way, the image file may be retrieved from shimmed data within the new data container 616 using the modified target location, which may mitigate additional I/O operations that may have occurred if the read I/O request was satisfied from virtual data within the (misaligned) virtual structure 614.

In one example, the alignment component 606 may identify an I/O request as originating from a logical application. The alignment component 606 may send a response to the logical application. The response may comprise shim information or rather information about the shim (e.g., a size, location, and/or other information regarding shim 618) and shimmed virtual data within the new data container 616 as the requested virtual data. The alignment component 606 may instruct the logical application to provide the shim information to a destination location within which the requested virtual data is to be stored. In this way, the requested virtual data may be stored within the destination location using an adjusted I/O offset derived from the shim information.

Figure 7:
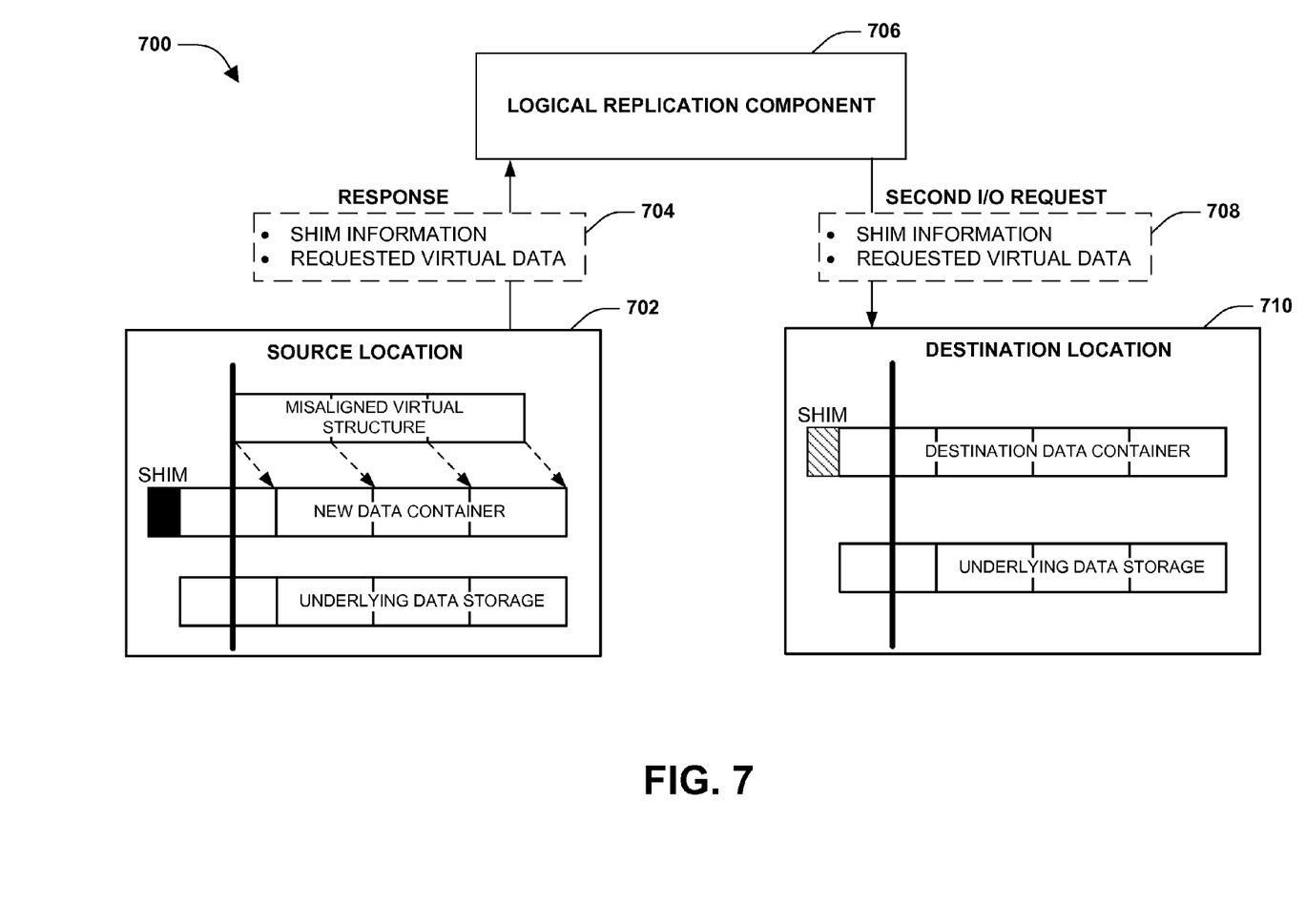
FIG. 7 is a component block diagram illustrating an exemplary system for propagating shimmed virtual data from a source location to a destination location within a virtualized storage environment.

FIG. 7 illustrates an example of a system 700 configured to propagate shimmed virtual data from a source location to a destination location within a virtualized storage environment. The system may comprise a logical replication component 706 (e.g., which may be associated with a logical application executing on a client device (e.g., 108, 110 in FIG. 1, 205 in FIG. 2) and/or a node (e.g., 116, 118 in FIG. 1, 202 in FIG. 2), such as a storage server, within the virtualized storage environment). The logical replication component 706 may be configured to interact with data and/or virtual data stored within one or more storage devices (e.g., 128, 130 in FIG. 1, 234 in FIG. 2) within the virtualized storage environment. For example, the logical replication component 706 may be configured to interact with a source location 702 in order to access virtual data within a virtual structure, shimmed data within a new data container, and/or data within underlying data storage. The logical replication component may be configured to interact with a destination location 710 in order to access virtual data within a destination data container and/or data within underlying data storage.

In one example of propagating shimmed virtual data, the logical replication component 706 may send a first I/O request to the source location 702 for requested virtual data, which may be stored as shimmed virtual data within the new data container at the source location 702. The logical replication component 706 may receive a response 704 from the source location 702. The response 704 may comprise shim information and/or shimmed virtual data as the requested virtual data. The shim information may comprise an adjusted I/O offset of the shimmed virtual data. The adjusted I/O offset may have been used to offset misalignment between a virtual data format associated with a manner with which virtual data was stored within the misaligned virtual structure and a storage data format associated with a manner with which data is stored within the underlying data storage at the source location 702.

The logical replication component 706 may send a second I/O request 708 to the destination location 710. The second I/O request may comprise the requested virtual data and/or the shim information (e.g., an adjusted I/O offset and/or information regarding the shim inserted into the new data container at the source location 702). In one example, because the destination data container may be misaligned, a shim may be added to the destination data container at the destination location 710 based upon the shim information (e.g., information about the shim). In this way, the requested virtual data within the second I/O request 708 may be stored within the shimmed destination data container using an adjusted I/O offset. In another example, the requested virtual data may be stored within the destination data container at an adjusted I/O offset without adding a shim to the destination data container. Thus, even though the destination data container may be misaligned, the stored virtual data may be aligned at the destination location based upon the shim information.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Figure 8:
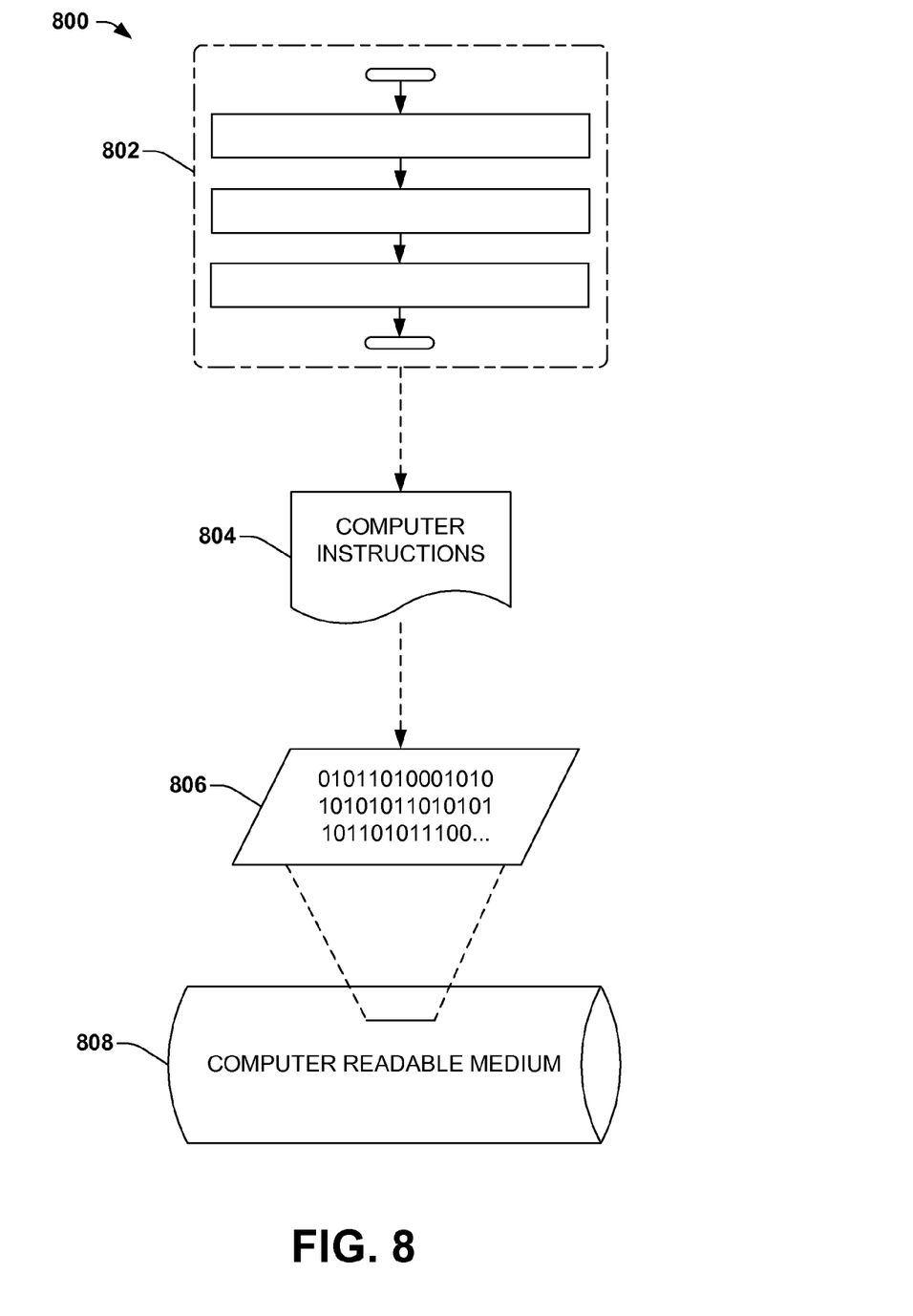
FIG. 8 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 8, where the implementation 800 comprises a computer-readable medium 808 (e.g., a CD-R, DVD-R, platter of a hard disk drive, flash drive, etc.), on which is encoded computer-readable data 806. This computer-readable data 806 in turn comprises a set of computer instructions 804 configured to operate according to the principles set forth herein. In one such embodiment, the processor-executable instructions 804 may be configured to perform a method 802, such as at least some of the method 300 of FIG. 3 and/or at least some of the method 400 of FIG. 4, for example, and/or at least some of a system, such as at least some of the system 500 of FIG. 5, at least some of the system 600 of FIG. 6, and/or at least some of the system 700 of FIG. 7, for example. Many such computer-readable media may be devised by those of ordinary skill in the art that are configured to operate in accordance with the techniques presented herein.

Although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Furthermore, to the extent that the terms "includes", "having", "has", "with", or variants thereof are used in either the detailed description or the claims, such terms are intended to be inclusive in a manner similar to the term "comprising." Also, "exemplary" means an example, not the best; "or" is intended to be inclusive not exclusive; "a" and/or "an" mean "one or more" unless specified otherwise and/or clear from context to be directed to a singular form; and at least one of A and B and/or the like generally means A or B or both A and B.

What is claimed is:

1. A method for non-disruptively addressing misalignment between a virtual data format and a storage data format within a virtualized storage environment, comprising:
    comparing a virtual data format associated with a manner with which virtual data is stored within a virtual structure and a storage data format associated with a manner with which data is stored within a storage device to determine a misalignment offset;
    creating a new data container within the storage device;
    inserting a shim, sized according to the misalignment offset, into a starting location of the new data container; and
    migrating virtual data within the virtual structure to the new data container, the migrating comprising adjusting I/O offsets of virtual data according to the shim, the migrating comprising maintaining availability of the virtual data within the virtual structure during the migration.

2. The method of claim 1, the shim comprising padding that is sized according to the misalignment offset.

3. The method of claim 1, the new data container comprising a new data volume.

4. The method of claim 1, comprising:
    querying metadata within the virtual structure to determine the virtual data format, the virtual data format comprising a virtual block size and a virtual offset of the virtual structure.

5. The method of claim 1, comprising:
    querying storage configuration data associated with the storage device to determine the storage data format, the storage data format comprising a storage block size and a storage offset of the storage device.

6. The method of claim 4, the comparing comprising:
    comparing the virtual block size and the virtual offset of the virtual data format with a storage block size and a storage offset of the storage data format to determine the misalignment offset.

7. The method of claim 4, the metadata comprising at least one of:
    a master boot record;
    a global unique ID (GUID) partition table; or
    a range of bytes comprised within a metadata table that is associated with the virtual structure.

8. The method of claim 1, the virtual structure comprising at least one of virtual machine data, a virtual disk, or a logical unit number (LUN).

9. The method of claim 1, the migrating comprising:
    migrating the virtual data to the new data container while a guest operating system of a virtual machine stored within the virtual data is executing from the virtual structure.

10. The method of claim 1, the migrating comprising:
    migrating the virtual data to the new data container without interrupting access to a guest operating system of a virtual machine stored within the virtual data.

11. The method of claim 1, comprising:
    satisfying an I/O request for requested virtual data using the virtual data within the new data container comprising the shim.

12. The method of claim 11, the satisfying comprising:
    modifying a target location specified within the I/O request based upon an adjusted I/O offset to identify the requested virtual data.

13. The method of claim 1, comprising:
    identifying an I/O request for requested virtual data as originating from a logical application; and
    sending a response to the logical application, the response comprising shim information and the requested virtual data obtained from the new data container.

14. The method of claim 13, comprising:
    instructing the logical application to provide the shim information to a destination location within which the requested virtual data is to be stored.

15. The method of claim 14, the requested virtual data stored within the destination location using an adjusted I/O offset derived from the shim information.

16. A method for propagating shimmed virtual data from a source location to a destination location within a virtualized storage environment, comprising:
    sending, from a logical application, a first I/O request to a source location for requested virtual data stored as shimmed virtual data within a new data container of a storage device;
    receiving a response comprising shim information about the shim and shimmed virtual data as the requested virtual data, the shim information comprising an adjusted I/O offset of the shimmed virtual data used to offset misalignment between a virtual data format associated with a manner with which virtual data is stored within a misaligned virtual structure and a storage data format associated with a manner with which data is stored within the storage device; and sending, from the logical application, a second I/O request to a destination location, the second I/O request comprising the requested virtual data and the shim information, the shim information used to store the requested virtual data using the adjusted I/O offset within the destination location.

17. A system for non-disruptively addressing misalignment between a virtual data format and a storage data format within a virtualized storage environment, comprising:
 a misalignment detection component configured to:
  compare a virtual data format associated with a manner with which virtual data is stored within a virtual structure and a storage data format associated with a manner with which data is stored within a storage device to determine a misalignment offset; and
 an alignment component configured to:
  create a new data container within the storage device;
  insert a shim, sized according to the misalignment offset, into a starting location of the new data container;
  migrate virtual data within the virtual structure to the new data container as shimmed virtual data, the migrating comprising adjusting I/O offsets of shimmed virtual data according to the shim; and
  maintain availability of the virtual data within the virtual structure during the migration.

18. The system of claim 17, the shim comprising padding sized according to the misalignment offset.

19. The system of claim 17, the new data container comprising a new data volume.

20. The system of claim 17, the alignment component configured to:
 migrate the virtual data to the new data container without interrupting access to a guest operating system of a virtual machine stored within the virtual data.

21. The system of claim 17, the alignment component configured to:
 satisfy an I/O request for requested virtual data using the shimmed virtual data within the new data container.

22. The system of claim 21, the alignment component configured to:
 modify a target location specified within the I/O request based upon an adjusted I/O offset to identify the shimmed virtual data.

23. The system of claim 17, the alignment component configured to:
 identify an I/O request for requested virtual data as originating from a logical application; and
 send a response to the logical application, the response comprising shim information and the shimmed virtual data obtained from the new data container.

24. The system of claim 23, the alignment component configured to:
 instruct the logical application to provide the shim information to a destination location within which the requested virtual data is to be stored.

25. The system of claim 24, the requested virtual data stored within the destination location using an adjusted I/O offset derived from the shim information.

26. A system for propagating shimmed virtual data from a source location to a destination location within a virtualized storage environment, comprising:
 a logical replication component configured to:
  send, from a logical application, a first I/O request to a source location for requested virtual data stored as shimmed virtual data within a new data container of a storage device;
  receive a response comprising shim information and shimmed virtual data as the requested virtual data, the shim information comprising an adjusted I/O offset of the shimmed virtual data used to offset misalignment between a virtual data format associated with a manner with which virtual data is stored within a misaligned virtual structure and a storage data format associated with a manner with which data is stored within the storage device; and
  send, from the logical application, a second I/O request to a destination location, the second I/O request comprising the requested virtual data and the shim information, the shim information used to store the requested virtual data using the adjusted I/O offset within the destination location.

27. A non-transitory computer readable medium comprising instructions which when executed perform a method for non-disruptively addressing misalignment between a virtual data format and a storage data format within a virtualized storage environment, comprising:
 comparing a virtual data format associated with a manner with which virtual data is stored within a virtual structure and a storage data format associated with a manner with which data is stored within a storage device to determine a misalignment offset;
 creating a new data container within the storage device;
 inserting a shim, sized according to the misalignment offset, into a starting location of the new data container; and
 migrating virtual data within the virtual structure to the new data container, the migrating comprising adjusting one or more I/O offsets of virtual data according to the shim, the migrating comprising maintaining availability of the virtual data within the virtual structure during the migration.

* * * * *